United States Patent [19]

Guest

[11] Patent Number: 4,588,214

[45] Date of Patent: May 13, 1986

[54] COUPLINGS FOR TUBES AND OTHER FLUID HANDLING COMPONENTS

[75] Inventor: Timothy S. Guest, Maidenhead, United Kingdom

[73] Assignee: John Guest Limited, Middlesex, United Kingdom

[21] Appl. No.: 549,864

[22] Filed: Nov. 8, 1983

[30] Foreign Application Priority Data

Dec. 13, 1982 [GB] United Kingdom ............... 8235422

[51] Int. Cl.$^4$ ............................................. F16L 2/06
[52] U.S. Cl. ................................. 285/323; 285/307; 285/921
[58] Field of Search ............... 285/322, 323, 307, 308, 285/423, 12, DIG. 22

[56] References Cited

U.S. PATENT DOCUMENTS

| | | | |
|---|---|---|---|
| 3,653,689 | 4/1972 | Sapy et al. | 285/323 X |
| 3,909,046 | 9/1975 | Legris | 285/323 X |
| 4,005,883 | 2/1977 | Guest | 285/369 X |
| 4,178,023 | 12/1979 | Guest | 285/323 |

FOREIGN PATENT DOCUMENTS

| | | | |
|---|---|---|---|
| 2413750 | 11/1974 | Fed. Rep. of Germany | 285/323 |
| 2000239 | 1/1979 | United Kingdom | 285/322 |

Primary Examiner—Richard J. Scanlan, Jr.
Attorney, Agent, or Firm—Beveridge, DeGrandi & Weilacher

[57] ABSTRACT

In a coupling formed of two components, one of which has a body portion with a bore having a taper to give a decreasing diameter towards an entry end of the bore, a collet having resilient arms being located in the bore and the second component having a tube adapted for insertion into said collet through the entry end to be gripped thereby, the tapered bore causing the grip to be tightened if the second component is pulled in the outward direction from the bore in the first component, in order to prevent separation of the components after assembly, the collet has a portion protruding out of the first component through said entry end of the bore and the second component has a portion extending around the protruding end of the collet and the two components having surfaces which abut to prevent the collet being pressed inwardly into the bore in the first component by moving the two components towards one another.

2 Claims, 2 Drawing Figures

COUPLINGS FOR TUBES AND OTHER FLUID HANDLING COMPONENTS

BACKGROUND TO THE INVENTION

1. Field of the Invention

This invention relates to couplings for tubes and other fluid handling components.

2. Prior Art

It is known (see for example U.S. Pat. Nos. 4,005,883 and 4,178,023) to form a coupling of two components, one of these components having a body portion with a bore having a taper to give a decreasing diameter towards an entry end of the bore, a collet having resilient arms being located in this bore, and the second component having a tube adapted for insertion into a said collet through the entry end to be gripped thereby, the tapered bore causing the grip to be tightened if the second component is pulled in the outward direction from the bore in the first component.

Such a construction enables a coupling to be effected, e.g. a tube secured in a fluid-tight manner to a first component, quickly and easily simply by inserting the tube in the first component.

In such constructions heretofore, the tube has been releasable from the first component by pressing the collet inwardly into the first component. There are however many requirements in which a tube has to be secured to another component to form a fluid-tight path through the coupling and in which it is required to prevent any uncoupling of the assembly.

It is an object of the present invention to provide a construction permitting the rapid assembly together of tubes or other fluid handling components which does not require the use of any tools but which forms a permanent and non-releasable coupling.

According to this invention, a coupling is formed of two components, one component having a body portion with a bore having a taper to give a decreasing diameter towards an entry end of the bore and with a collet having resilient arms in the bore and the second component having a tube adapted for insertion into said collet through the entry end to be gripped thereby, the tapered bore causing the grip to be tightened if the second component is pulled in the outward direction from the bore in the first component, the collet having a portion protruding out of the first component through said entry end of the bore and the second component having a portion extending around the protruding end of the collet and the two components having surfaces which abut to prevent the collet being pressed inwardly into the bore in the first component by moving the two components towards one another.

The collet conveniently has a circular head or flange lying outside the bore in the first component, which head or flange forms a rigid support for the collet arms and, in this case, the second component may have an annular recess in an end face to receive the head or flange on the collet.

With the construction described above, the tube on the second component can be inserted into the collet in the bore of the first component and is gripped thereby. Any attempt to pull the components apart results in the grip tightening. In this construction, it is not possible to obtain access to the outer end of the collet to press it into or hold it inwardly in the first component to release the collet grip on said tube.

The two components are conveniently made of rigid or semi-rigid plastics material. It will be noted that the first component can be used, on its own, as a coupling to receive a tube and, in this case it forms a releasable coupling. However the co-operative use of the two components forms an assembly in which the components can be joined simply by putting them together with the tube on the second component passing into the collet; they cannot then be pulled apart.

DESCRIPTION OF THE PREFERRED EMBODIMENT

Figure 1:
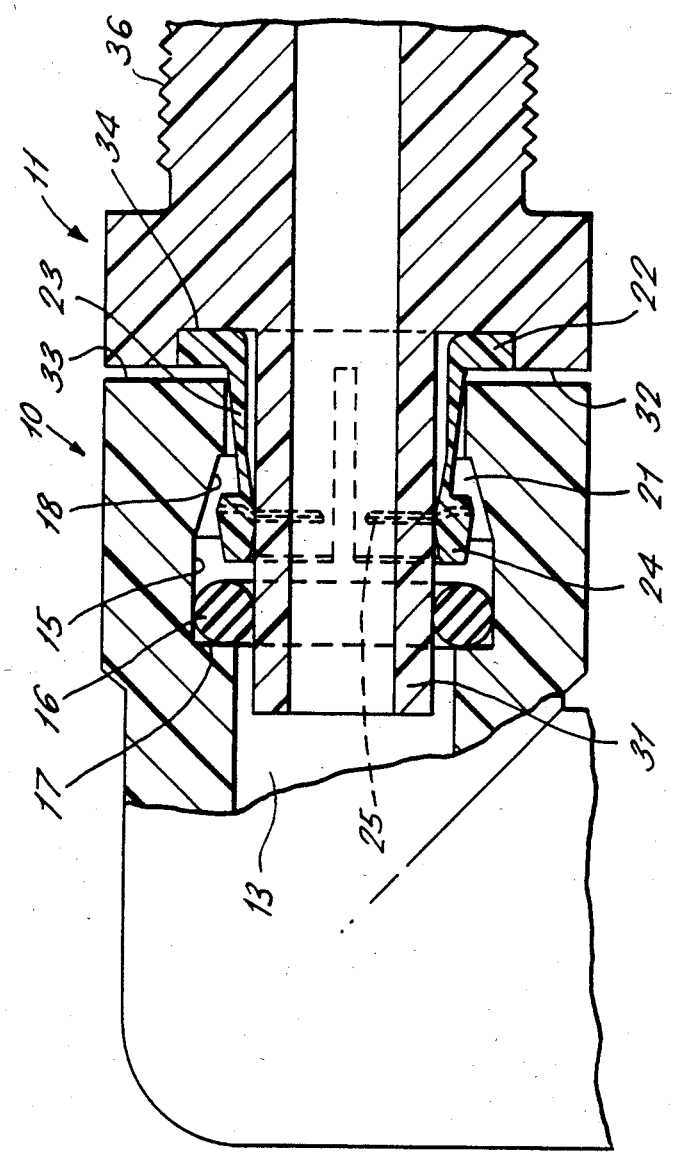
FIG. 1 is a sectional view of an assembled coupling which has two components and a collet.
Figure 2:
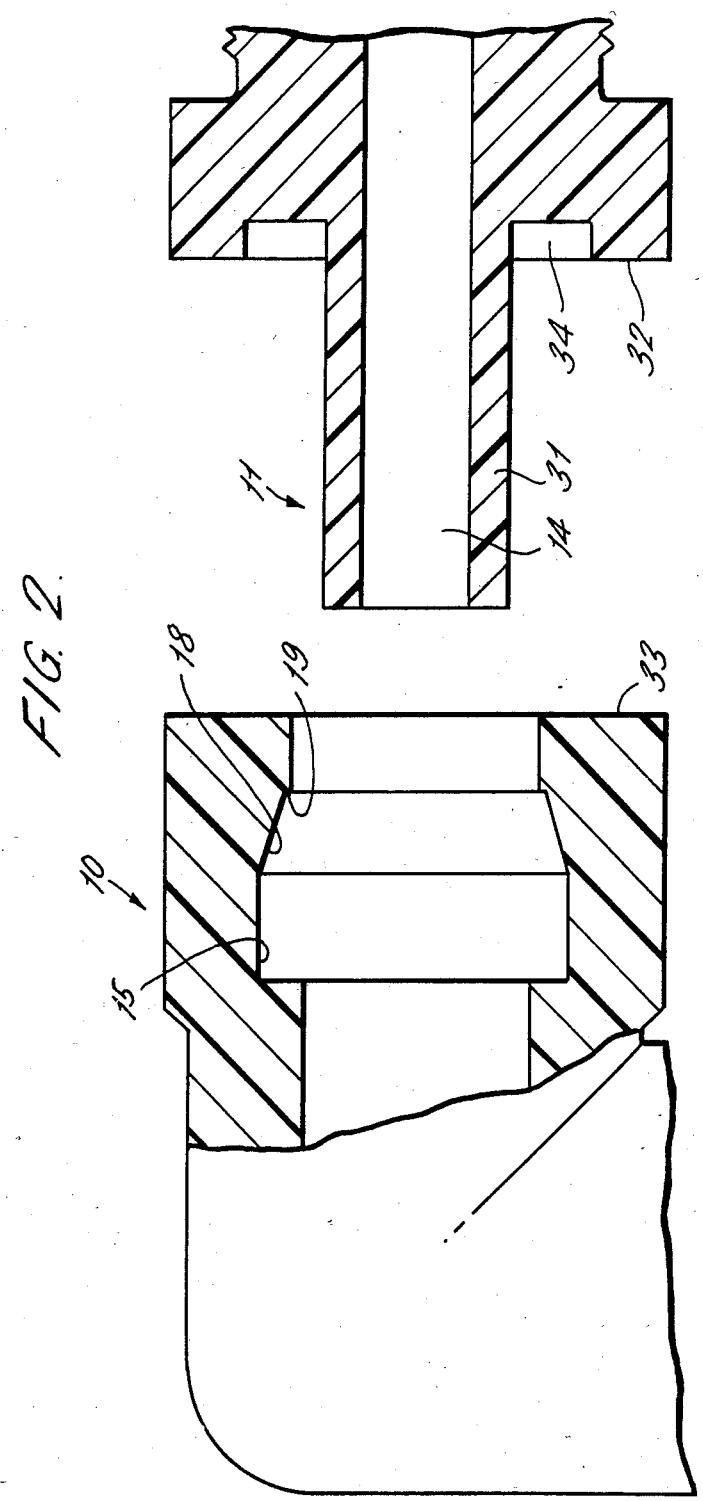
FIG. 2 is an exploded sectional view of the two components of FIG. 1.

Referring to the drawings, there is shown a coupling comprising a first component 10 and a second component 11. The two components may each form a part of a complex structure. In the particular embodiments illustrated, the component 10 is shown as a tubular right-angle bend whilst the component 11 is shown as a threaded connector. Bores 13, 14 extend respectively through the two components which thus constitute fluid handling components. They may for example be parts of a gas or liquid feed system.

The component 10 has an enlarged diameter portion 15 in its bore, which contains an O-ring or other similar seal 16 abutting against a shoulder 17 in the coupling body. The enlarged diameter portion 15, towards the entry end of the bore adjacent the second coupling portion 11, has a tapered portion 18 tapering to a narrower diameter in the axially outward direction, this taper being terminated by an inwardly facing shoulder 19 between the taper portion 18 and a narrower diameter portion 20. Within this part of the component 10 which forms a coupling body, is a collet 21 having a ring portion 22 constituting a head lying outside the coupling body. This head 22 is formed integrally with a plurality of collet arms, typically four arms 23, formed of resilient material and extending in the axial direction of the bore. These arms, in transverse cross-section, are of generally arcuate shape to embrace a tubular portion 31 of the second component 11 when the two components are assembled together. Towards their axially inner ends, the collet arms 23 are formed with a head portion 24 having a tooth element 25 extending radially inwardly to abut against and bite into the tube portion 31. Conveniently the collet is formed of plastics material with the tooth element 25 constituted by a metal insert embedded in the plastics material of the collet. The head portion 24 on the ends of the collet arms 23 are forced slightly outwardly in a radial direction against the resilience of the arms when the tube portion 31 is inserted in the collet. These arms will thus engage against the tapered portion 18 of the bore in the component 10 when the tubular portion 31 is inserted into the collet. If the collet is then moved axially outwardly, this engagement with the tapered portion of the bore causes the collet to grip the tubular portion 31 more tightly.

The second component 11 has the aforementioned tubular portion 31 protruding from an end face 32 which, when the parts are assembled together, lies closely adjacent an end face 33 on the component 10. An annular recess 34 in the end face 32 is shaped to receive the head 22 of the collet when the two components are assembled together as shown in FIG. 1.

It will be seen that the two components can be assembled by pushing the tubular portion 31 of component 11 into the collet. When assembled, the collet grips the tubular portion 31 and any pull to try to separate the two components causes the grip to be tightened. Because the head 22 lies in the annular recess in the end face of the second component, it is not possible to obtain access to the outer end of the collet and hence it is not possible to press the collet inwardly into the first component or to hold it inwardly in such a manner as to prevent the collet arms gripping the tubular portion 31. The two components are thus permanently secured together.

It will be noted however that the component 10 may be used as a conventional coupling unit for coupling to a tube to be inserted into the collet. The component 10 then constitutes a releasable coupling in which a tube may be secured simply by inserting it in the collet and in which the tube can be withdrawn when required by holding the collet inwardly into the component 10. The use of the component 11 thus enables the coupling component 10 to be formed into part of a non-releasable coupling. It thus becomes possible to use a standardised component for both releasable and non-releasable couplings.

In the construction illustrated, the component 11 is shown as having an outer threaded end 36. This is merely an example of a construction which might be employed. These components however may take various forms and may be parts of larger fittings or assemblies.

It will be particularly noted that the non-releasable connector portion constitutes a very short and small sized assembly as well as permitting two components to be joined without requiring any special tools.

I claim:

1. A coupling having two components, one component comprising a body portion with an open ended bore extending into the body portion, said bore having a tapered portion decreasing in diameter towards the open end of the bore, and a collet extending into the bore from said open end and having resilient arms in the bore and the second component having a tube adapted for insertion into said collet through the entry end to be resiliently gripped by the arms, the tapered bore having an interior wall which is engageable against the resilient arms to tighten the grip of the resilient arms on the tube when the second component is pulled in the outward direction from the bore in the first component, the collet having a portion with an outer end protruding out of the first component through said entry end of the bore, said second component having means for receiving and enclosing the outer end of the collet to prevent access to and pressing of said outer end in a direction which would release the collet from the second component by movement of the collet relative to the second component and inwardly into the bore of the first component.

2. A coupling as claimed in claim 1 wherein the collet has a circular head or flange lying outside the bore in the first component, which head or flange forms a rigid support for the collet arms and wherein the second component has an annular recess in an end face to receive the head or flange on the collet.

* * * * *